United States Patent
Younes et al.

(10) Patent No.: US 11,680,521 B2
(45) Date of Patent: Jun. 20, 2023

(54) INTEGRATED PRODUCTION OF HYDROGEN, PETROCHEMICALS, AND POWER

(71) Applicant: Saudi Arabian Oil Company, Dhahran (SA)

(72) Inventors: Mourad Younes, Dhahran (SA); Aqil Jamal, Dhahran (SA); Aadesh Harale, Dhahran (SA); Ibrahim Abba, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 591 days.

(21) Appl. No.: 16/701,760

(22) Filed: Dec. 3, 2019

(65) Prior Publication Data
US 2021/0164393 A1 Jun. 3, 2021

(51) Int. Cl.
*F02C 3/20* (2006.01)
*B01D 53/047* (2006.01)
(Continued)

(52) U.S. Cl.
CPC .............. *F02C 3/20* (2013.01); *B01D 53/047* (2013.01); *B01J 7/00* (2013.01); *B01J 19/245* (2013.01);
(Continued)

(58) Field of Classification Search
CPC .... C01B 2203/0283; C01B 2203/0233; C01B 3/02; C01B 3/12; C01B 3/34; C01B 3/56; C10G 2/50; C10G 69/00
See application file for complete search history.

(56) References Cited

U.S. PATENT DOCUMENTS

| | | | |
|---|---|---|---|
| 978,576 | A | 12/1910 | Goodell |
| 3,755,143 | A | 8/1973 | Hosoi et al. |

(Continued)

FOREIGN PATENT DOCUMENTS

| | | | | |
|---|---|---|---|---|
| CA | 2809503 A1 | * | 6/2013 | ............... C01B 3/34 |
| CA | 2938299 | | 5/2015 | |

(Continued)

OTHER PUBLICATIONS

PCT International Search Report and Written Opinion issued in International Application No. PCT/US2020/062723 dated Mar. 18, 2021, 17 pages.

(Continued)

*Primary Examiner* — Jafar F Parsa
(74) *Attorney, Agent, or Firm* — Fish & Richardson P.C.

(57) ABSTRACT

A processing facility is provided. The processing facility includes an asphaltenes and metals (AM) removal system configured to process a feed stream to produce a power generation stream, a hydroprocessing feed stream, and an asphaltenes stream. A power generation system is fed by the power generation feed stream. A hydroprocessing system is configured to process the hydroprocessing feed stream to form a gas stream and a liquid stream. A hydrogen production system is configured to produce hydrogen, carbon monoxide and carbon dioxide from the gas feed stream. A carbon dioxide conversion system is configured to produce synthetic hydrocarbons from the carbon dioxide, and a cracking system is configured to process the liquid feed stream.

26 Claims, 3 Drawing Sheets

(51) Int. Cl.
| | |
|---|---|
| *B01J 7/00* | (2006.01) |
| *B01J 19/24* | (2006.01) |
| *C01B 3/02* | (2006.01) |
| *C01B 3/12* | (2006.01) |
| *C01B 3/34* | (2006.01) |
| *C01B 3/56* | (2006.01) |
| *C10G 69/00* | (2006.01) |
| *C10G 2/00* | (2006.01) |

(52) U.S. Cl.
CPC ............. *C01B 3/02* (2013.01); *C01B 3/12* (2013.01); *C01B 3/34* (2013.01); *C01B 3/56* (2013.01); *C10G 2/50* (2013.01); *C10G 69/00* (2013.01); *B01D 2256/16* (2013.01); *B01D 2257/502* (2013.01); *B01D 2257/504* (2013.01); *C01B 2203/0233* (2013.01); *C01B 2203/0283* (2013.01); *C01B 2203/042* (2013.01); *C01B 2203/047* (2013.01); *C01B 2203/0475* (2013.01); *C01B 2203/065* (2013.01); *C10G 2300/205* (2013.01); *C10G 2300/206* (2013.01); *C10G 2300/42* (2013.01); *C10G 2400/30* (2013.01); *F05D 2220/32* (2013.01)

(56) References Cited

U.S. PATENT DOCUMENTS

| | | |
|---|---|---|
| 3,856,659 A | 12/1974 | Owen |
| 3,979,757 A | 9/1976 | Kilby et al. |
| 4,090,949 A | 5/1978 | Owen et al. |
| 4,134,824 A | 1/1979 | Kamm et al. |
| 4,264,435 A | 4/1981 | Read, Jr. et al. |
| 4,297,203 A | 10/1981 | Ford et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,717,407 A | 1/1988 | Choe et al. |
| 4,725,349 A | 2/1988 | Okamoto et al. |
| 4,830,728 A | 5/1989 | Herbst et al. |
| 4,992,160 A | 2/1991 | Long et al. |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,837,032 A | 11/1998 | Moll et al. |
| 5,904,837 A | 5/1999 | Fujiyama |
| 5,906,728 A | 5/1999 | Iaccino et al. |
| 5,951,850 A | 9/1999 | Ino et al. |
| 6,033,555 A | 3/2000 | Chen et al. |
| 6,179,900 B1 | 1/2001 | Behling et al. |
| 6,190,533 B1 | 2/2001 | Bradow et al. |
| 6,210,562 B1 | 3/2001 | Xie et al. |
| 6,274,032 B2 | 8/2001 | Hood et al. |
| 6,293,979 B1 | 9/2001 | Choudhary et al. |
| 6,361,582 B1 | 3/2002 | Pinnau et al. |
| 6,531,515 B2 | 3/2003 | Moore, Jr. et al. |
| 6,656,346 B2 | 12/2003 | Ino et al. |
| 6,743,961 B2 | 6/2004 | Powers |
| 6,896,717 B2 | 5/2005 | Pinnau et al. |
| 6,979,757 B2 | 12/2005 | Powers |
| 7,019,187 B2 | 3/2006 | Powers |
| 7,045,554 B2 | 5/2006 | Raje |
| 7,132,042 B2 | 11/2006 | Genetti et al. |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,550,642 B2 | 6/2009 | Powers |
| 7,642,292 B2 | 1/2010 | Severinsky |
| 7,744,747 B2 | 6/2010 | Halsey |
| 7,858,834 B2 | 12/2010 | Powers |
| 7,972,498 B2 | 7/2011 | Buchanan et al. |
| 7,973,087 B2 | 7/2011 | Kibby et al. |
| 8,198,338 B2 | 6/2012 | Shulenberger et al. |
| 8,828,121 B1 | 9/2014 | He et al. |
| 9,067,850 B2 | 6/2015 | Abbott |
| 9,085,497 B2 | 7/2015 | Jennings |
| 9,242,230 B2 | 1/2016 | Moon et al. |
| 9,328,035 B1 | 5/2016 | Kuhn et al. |
| 9,752,080 B2 | 9/2017 | Christensen et al. |
| 10,357,759 B2 | 7/2019 | D'Souza et al. |
| 2003/0129109 A1 | 7/2003 | Bronicki |
| 2005/0217479 A1 | 10/2005 | Hale et al. |
| 2008/0001645 A1 | 1/2008 | Kuroki |
| 2008/0011644 A1 | 1/2008 | Dean et al. |
| 2008/0011645 A1 | 1/2008 | Dean |
| 2008/0083648 A1 | 4/2008 | Bishop et al. |
| 2008/0277314 A1 | 11/2008 | Halsey |
| 2008/0283445 A1 | 11/2008 | Powers |
| 2009/0050523 A1 | 2/2009 | Halsey |
| 2010/0137458 A1 | 6/2010 | Erling |
| 2012/0111051 A1 | 5/2012 | Kulkarni et al. |
| 2012/0168154 A1 | 7/2012 | Chinn et al. |
| 2012/0323059 A1 | 12/2012 | Liu et al. |
| 2013/0129610 A1 | 5/2013 | Kale |
| 2015/0240717 A1 | 8/2015 | Starcher et al. |
| 2015/0290575 A1 | 10/2015 | Rothermel et al. |
| 2017/0050845 A1 | 2/2017 | Lofberg et al. |
| 2017/0107433 A1* | 4/2017 | Choi ............... C10G 55/02 |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0312767 A1 | 11/2018 | Al-Sayed et al. |
| 2019/0112535 A1 | 4/2019 | Kinzl et al. |

FOREIGN PATENT DOCUMENTS

| | | |
|---|---|---|
| EP | 0130933 | 9/1987 |
| EP | 684066 | 11/1995 |
| EP | 1130080 | 9/2001 |
| EP | 0909804 | 9/2010 |
| WO | WO 2010143783 | 12/2010 |
| WO | WO 2015183200 | 12/2015 |
| WO | WO 2016207892 | 12/2016 |
| WO | WO 2018142351 | 8/2018 |
| WO | WO 2018226617 | 12/2018 |

OTHER PUBLICATIONS

Weiss et al., "Coking of Oil Sands, Asphaltenes and Residual Oils in the LR-Process," Unitar Conference, Aug. 9, 1988, 23 pages.

Amo et al., "Low-Quality Natural Gas Sulfur Removal/Recovery," Membrane Technology and Research, DOE Report DE-AC21-92MC28133—01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

Chatterjee et al., "Poly(ether urethane) and poly(ether urethane urea) membranes with high $H_2S/CH_4$ selectivity," Journal of Membrane Science, vol. 135, No. 99, Nov. 1997, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

(56) References Cited

OTHER PUBLICATIONS

Lallemand et al., "Highly sour gas processing: Bulk removal with SPREX Process," IPTC-10581-MS, International Petroleum Technology Conference, Nov. 2005, 18 pages.
Lallemand et al., "Solutions for the treatment of highly sour gases," Digital Refinding: Processing, Operations & Maintenance, Apr. 2012, 14 pages.
Lockhart, "Sour oil and gas management: 3.3," vol. Lii/New Developments: Energy, Transport, Sustainability Encyclopedia of Hydrocarbons, 2007, 34 pages.
Lokhandwala et al., "Membrane separation of nitrogen from natural gas: A case study from membrane synthesis to commercial deployment," Journal of Membrane Science 346, Jan. 2010, 10 pages.
Merkel and Toy, "Comparison of Hydrogen Sulfide Transport Properties in Fluorinated and Nonfluorinated Polymers," Macromolecules, vol. 39, No. 22, Sep. 2006, 10 pages.
Robeson, "The upper bound revisited," Journal of Membrane Science, vol. 320, Jul. 15, 2008, 11 pages.
Rufford et al., "The removal of $CO_2$ and $N_2$ from natural gas: A review of conventional and emerging process technologies," Journal of Petroleum Science and Engineering, vol. 94-95, Sep. 2012, 32 pages.

\* cited by examiner

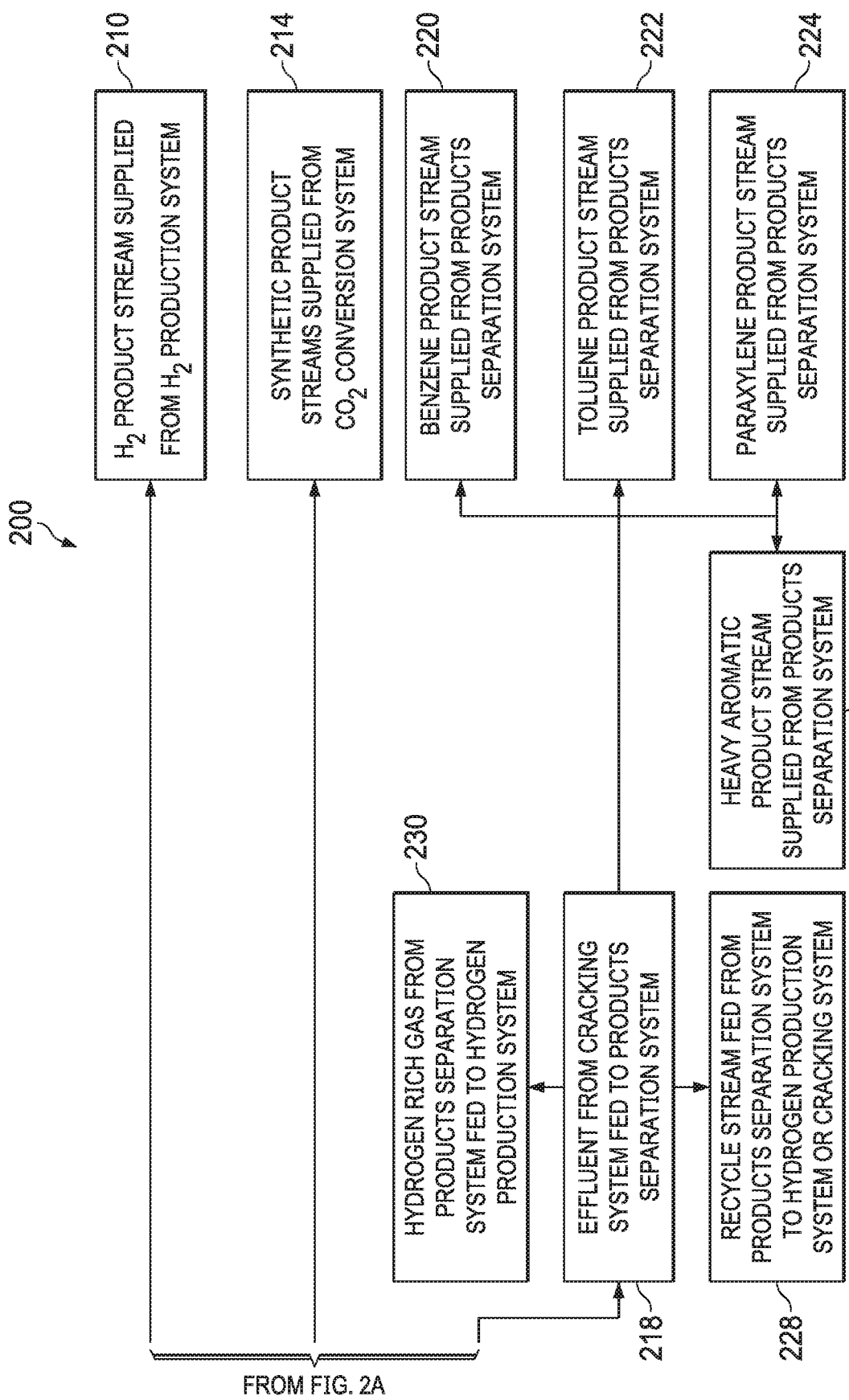

INTEGRATED PRODUCTION OF HYDROGEN, PETROCHEMICALS, AND POWER

BACKGROUND

Olefins, such as ethylene, propylene, butylene, and butane, and aromatics, such as benzene, toluene, and xylene, are basic intermediates that are widely used in the petrochemical and chemical industries. Steam cracking and reforming are used to form olefins and aromatics from feedstocks such as petroleum gases and distillates such as naphtha, kerosene, and gas oil.

SUMMARY

An embodiment described herein provides a processing facility. The processing facility includes an asphaltenes and metals (AM) removal system configured to process a feed stream to produce a power generation stream, a hydroprocessing feed stream, and an asphaltenes stream. A power generation system is fed by the power generation feed stream. A hydroprocessing system is configured to process the hydroprocessing feed stream to form a gas stream and a liquid stream. A hydrogen production system is configured to produce hydrogen, carbon monoxide and carbon dioxide from the gas feed stream. A carbon dioxide conversion system is configured to produce synthetic hydrocarbons from the carbon dioxide, and a cracking system is configured to process the liquid feed stream.

Another embodiment described herein provides a method for generating power and petrochemicals in an integrated system. The method includes removing asphaltenes and metals (AM) from a feed stream in an AM removal system to form a power generation stream, a hydroprocessing feed stream, and an asphaltenes stream. The power generation stream is supplied to a power generation system. The hydroprocessing feed stream is processed in a hydroprocessing system to form a gas stream and a liquid stream, and the gas stream is provided to a hydrogen production system. The liquid stream is provided to a cracking system.

BRIEF DESCRIPTION OF DRAWINGS

FIGS. 2A and 2B are flowcharts of a process for using a feed stream to directly power a generation system while producing petrochemicals.

DETAILED DESCRIPTION

A hydrotreating and cracking process that is part of an integrated system with a power generation system is provided in examples described herein. In the process, a feed stream including crude oil or condensates is directly processed to generate power, hydrogen, and petrochemicals, including aromatic petrochemicals, such as benzene, toluene, and paraxylene. In addition to power, these technologies can be used to produce synthetic gases and potentially hydrogen. When targeting low carbon footprint fuels, $CO_2$ from steam reforming technologies may be captured, used, or stored.

The feed stream is processed in an asphalt and metal removal system to form three streams, including a first stream that is deasphalted and demetallized to form a power generation stream. The power generation stream can be directly used to power a turbine generation system, for example, having a performance similar to diesel fuel. Accordingly, the power generation stream would replace a diesel stream from a refinery, lowering the cost of the refining process.

A second stream formed from the feed stream is deasphalted, but may have some amount of metals present, and is used for a hydroprocessing feed stream. The third stream includes asphalt and the majority of the metals, and may be used to supply an asphalt product stream, or may be processed in a heavy oil conversion system, a coker, a heavy metal extraction unit, or any combinations thereof. In some embodiments, the third stream is fed to a gasifier or partial oxidation unit for hydrogen production, synthetic hydrocarbon production, or both.

As used herein, the term crude oil refers to whole crude oil from conventional sources, including crude oil that has undergone some pre-treatment. For example, crude oil can refer to material that has been subjected to one or more of water-oil separation, gas-oil separation, desalting, and stabilization. As used herein, material in a naphtha boiling temperature range may have a boiling point below about 300° C. Material in a diesel plus boiling temperature range may have a boiling point of greater than about 180° C.

As used herein, a system, or processing system, is an integrated group of processing equipment configured to perform a particular function, such as power generation, separations, hydroprocessing, cracking, hydrogen production, and the like. Further, systems often include vessels, and other equipment, to perform multiple functions. For example, a hydroprocessing system may include separation vessels to separate effluent into multiple streams. A processing system may include a single vessel, or multiple vessels, and all associated catalysts, pumps, valves, compressors, and process equipment used to perform the designated function. Similarly, a power generation system may include one or more turbine driven generators, each of which includes one or more combustors, air feed systems, cooling systems, and the like.

Figure 1:
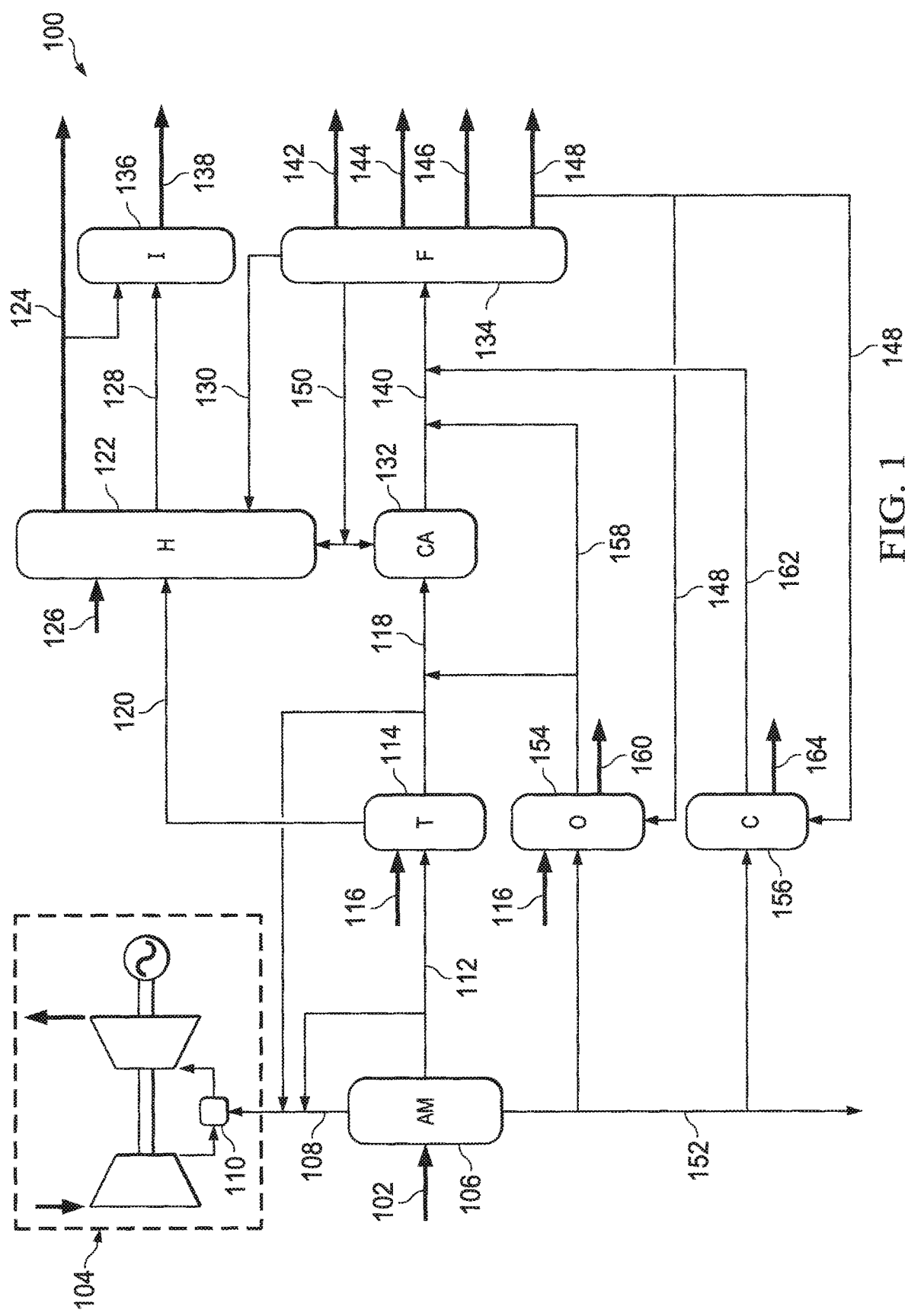
FIG. 1 is an example of a processing facility that utilizes a feed stream to directly fuel a power generator and convert the feed stream into petrochemicals, including aromatic petrochemicals.

FIG. 1 is an example of a processing facility 100 that utilizes a feed stream 102 to directly fuel a power generator and to convert the feed stream into hydrogen and petrochemicals, including aromatic petrochemicals. The feed stream 102, which may be a crude oil or condensates stream, is received into an asphaltene and heavy metal (AM) removal system 106. Generally, the feed stream 102 will have a distillation curve ranging from about 0° C. to about 900° C., or about 30° C. to about 600° C. The AM removal system 106 may be a solvent deasphalting system that solubilizes lighter hydrocarbons, leaving the less soluble asphaltenes and associated metals behind. Solvent deasphalting units typically operate between 45° C. and 250° C. and at pressures between about 15 and about 50 bar. The ratio of the solvent to the crude oil is between about 4 to 1 and about 13 to 1.

The AM removal system provides a power generation stream 108 that can be sent to the power generation system 104 and combusted in a combustor 110 to power gas turbines. In various embodiments, the turbines are E class, F class, H class, J class, or advanced and future gas turbines with higher turbine inlet temperatures. The power generation stream 108 is a high-purity oil stream that has very low, or no, asphaltene, and a low content of heavy metals such as vanadium and nickel. In various embodiments, asphaltene is absent from the power generation stream 108, or is less than about 1 ppm, less than about 5 ppm, or less than about 10 ppm. In various embodiments, the power generation stream 108 has less than about 0.5 ppmv, or between about 0.5 and about 0.7 ppmv, or between about 0.7, and 1.2 ppmv.

The level of the heavy metals, such as vanadium, in the power generation stream 108 can be controlled to match the requirements of the power generation system 104 in order to maximize the power production while reducing operating costs, for example, due to maintenance, water injection, or chemicals injection to mitigate corrosion. Higher efficiency in gas turbines in a power generation system 104 can be obtained by increasing the firing temperature of the combustors compared to heavier oils or oils that include heavy metals. The power generation stream 108 may include the light ends up to boiling points corresponding to heavy naphtha or kerosene range with boiling temperature up to about 260° C.

Further, during the deasphalting and demetallization processes, sulfur levels in the treated streams, for example, the power generation stream 108 and a hydroprocessing feed stream 112 are reduced. The reduction is typically in the range of about 20% to about 30%, compared to the feed stream 102. This lowers the SOx emissions from the power generation system 104, and reduces any need for desulfurization.

The hydroprocessing feed stream 112 is a mid-purity stream, for example, free of asphaltenes or having a low asphaltene content, such as less than about 5 wt. %, less than about 7 wt. %, or less than about 10 wt. %. Furthermore, the hydroprocessing feed stream 112 may have a moderate heavy metals content. For example, the heavy metal content can range between about 0.5 ppmv and about 100% of the heavy metal content of the feed stream 102. The hydroprocessing feed stream 112 may include middle and heavy distillates, for example, with boiling points above 180° C.

The hydroprocessing feed stream 112 is routed to a hydroprocessing system 114 for removal of impurities such as sulfur, metals, nitrogen, or other impurities. In some embodiments, the hydroprocessing system 114 performs a hydrocracking function to form additional products from the hydroprocessing feed stream 112. As shown in FIG. 1, in some embodiments, a portion of the hydroprocessing feed stream 112 may be combined with the power generation stream 108, for example, to control the level of impurities in a power generation stream 108. This may be performed if the feed stream 102 has a lower asphaltenes or metals content, allowing more of the feed stream 102 to be sent to the power generation system 104.

The hydroprocessing system 114 may include a single hydroprocessing vessel with a single catalyst zone or multiple catalyst zones. In other examples, the hydroprocessing system may include multiple vessels, wherein each may use different catalysts and conditions to perform different functions, such as hydrodesulfurization, hydrodemetallation, hydrocracking, and the like. The hydroprocessing system 114 is discussed further herein. A hydrogen stream 116 is provided to the hydroprocessing system 114.

In some examples, selective hydroprocessing or hydrotreating processes can increase the paraffin content, or decrease the viscosity as measured by the Bureau of Mines Correlation Index (BMCI) of a feedstock. For example, the hydroprocessing feed stream 112 may be improved by hydrotreating to saturate multiple carbon-carbon bonds, followed by mild hydrocracking of aromatics, especially polyaromatics. When hydrotreating a crude oil, contaminants such as metals, sulfur and nitrogen can be removed by passing the feedstock through a series of layered catalysts that perform the catalytic functions of one or more of demetallization, desulfurization, and denitrogenation. In some examples, the sequence of catalysts to perform hydrodemetallization (HDM) and hydrodesulfurization (HDS) can include a hydrodemetallization catalyst, an intermediate catalyst, a hydrodesulfurization catalyst, and a final catalyst.

The catalyst in the HDM section can be based on a gamma alumina support, with a surface area of between about 140 m2/g and about 240 m2/g. This catalyst has a very high pore volume, such as a pore volume in excess of about 1 cm3/g. The pore size can be predominantly macroporous, which provides a large capacity for the uptake of metals on the surface of the catalyst, and optionally dopants. The active metals on the catalyst surface can be sulfides of nickel (Ni), molybdenum (Mo), or both, with a molar ratio of Ni:(Ni+ Mo) of less than about 0.15. The concentration of nickel is lower on the HDM catalyst than other catalysts as some nickel and vanadium is anticipated to be deposited from the feedstock itself, thus acting as a catalyst. The dopant can be one or more of phosphorus, boron, silicon and halogens, for instance, as described in U.S. Patent Publication Number US 2005/0211603, the contents of which are incorporated by reference here in their entirety. In some examples, the catalyst can be in the form of alumina extrudates or alumina beads. For instance, alumina beads can be used to facilitate un-loading of the catalyst HDM beds in the reactor as the metal can uptake will range between from 30 to 100% at the top of the bed.

An intermediate catalyst can be used to perform a transition between the hydrodemetallization and hydrodesulfurization functions. The intermediate catalyst can have intermediate metal loadings and pore size distribution. The catalyst in the HDM/HDS reactor can be an alumina based support in the form of extrudates, at least one catalytic metal from group VI (for instance, molybdenum, tungsten, or both), or at least one catalytic metals from group VIII (for instance, nickel, cobalt, or both), or a combination of any two or more of them. The catalyst can contain at least one dopant, such as one or more of boron, phosphorous, halogens, and silicon. The intermediate catalyst can have a surface area of between about 140 m$^2$/g and about 200 m$^2$/g, a pore volume of at least about 0.6 cm$^3$/g, and mesoporous pores sized between about 12 nm and about 50 nm.

The catalyst in the HDS section can include gamma alumina based support materials with a surface area towards the higher end of the HDM range, such as between about 180 m$^2$/g and about 240 m$^2$/g. The higher surface for the HDS catalyst results in relatively smaller pore volume, such as a pore volume of less than about 1 cm$^3$/g. The catalyst contains at least one element from group VI, such as molybdenum, and at least one element from group VIII, such as nickel. The catalyst also contains at least one dopant, such as one or more of boron, phosphorous, silicon, and halogens. In some examples, cobalt (Co) can be used to provide relatively higher levels of desulfurization. The metals loading for the active phase is higher as the desired activity is higher, such that the molar ratio of Ni:(Ni+Mo) is between about 0.1 and about 0.3 and the molar ratio of (Co+Ni):Mo is between about 0.25 and about 0.85.

A final catalyst can perform hydrogenation of the feedstock rather than having a primary function of hydrodesulfurization. In some examples, the final catalyst can replace the intermediate catalyst and the catalyst in the HDS section. The final catalyst can be promoted by nickel and the support can be wide pore gamma alumina. The final catalyst can have a surface area towards the higher end of the HDM range, such as between about 180 m2/g and about 240 m2/g. The higher surface area for the final catalyst results in relatively smaller pore volume, such as a pore volume of less than about 1 cm3/g.

As described herein, the hydroprocessing system 114 processes the hydroprocessing feed stream 112 with hydrogen from the hydrogen stream 116. The hydrogen stream 116 can be either imported to the hydroprocessing system 114, for example, being produced in other systems of the processing facility 100. The hydrogen may be added at 0.1 mol. %, 0.5 mol. %, 1 mol. %, 5 mol. %, or higher, as a proportion of the hydroprocessing feed stream 112. This may improve products from a cracker, as cracking of materials having higher hydrogen contents results in better products. The hydroprocessing system 114 also increases the amount of feed available for cracking or power production via conversion.

As described herein, the hydroprocessing system 114 can carry out one or more of the following processes, generally in separate reaction zones: hydrodemetallization, hydrodearomatization, hydrodenitrogenation, hydrodesulfurization, and hydrocracking. The processes may be performed in single reactors having multiple zones, or in multiple reactors. The hydroprocessing system 114 can include one or more beds containing an effective amount of hydrodemetallization catalyst. The hydroprocessing system 114 can include one or more beds containing an effective amount of hydroprocessing catalyst having one or more of hydrodearomatization, hydrodenitrogenation, hydrodesulfurization, and hydrocracking functions. In some examples, the hydroprocessing system 114 can include multiple catalyst beds, such as two, three, four, five, or another number of catalyst beds. In some examples, the hydroprocessing system 114 can include multiple reaction vessels each containing one or more catalyst beds of the same or different function.

The hydroprocessing system 114 can operate at a temperature between about 300° C. and about 450° C., such as about 300° C., about 350° C., about 400° C., about 450° C., or another temperature. The hydroprocessing system 114 can operate at a pressure between about 30 bar and about 180 bar, such as about 30 bar, about 60 bar, about 90 bar, about 120 bar, about 150 bar, about 180 bar, or another pressure. The hydroprocessing system 114 can operate with a liquid hour space velocity between about 0.1 h$^{-1}$ and about 10 h$^{-1}$, such as about 0.1 h$^{-1}$, about 0.5 h$^{-1}$, about 1 h$^{-1}$, about 2 h$^{-1}$, about 4 h$^{-1}$, about 6 about 8 h$^{-1}$, about 10 h$^{-1}$, or another liquid hour space velocity. The liquid hour space velocity is the ratio of the flow rate of a reactant liquid through a reactor to the volume of the reactor.

The products from the hydroprocessing system 114 include a liquid stream 118 and a gas stream 120. The liquid stream 118 and the gas stream 120 may be produced from hydroprocessed effluent by a separator in the hydroprocessing system 114. The separator may be a high pressure cold or hot separator. In some examples, the effluent can be cooled in a heat exchanger prior to the separator. The separator separates the hydroprocessed effluent into the gas stream 120, which generally includes lower carbon number liquids, such as C4 and below, with boiling point up to about 180° C., and the liquid stream 118, which generally has a boiling point greater than about 180° C., such as materials with carbon numbers of C5 and above. In some embodiments, the separator is a flash separation device such as a flash drum, followed by a heat exchanger or condenser. In some embodiments, the separator operates in the absence of a flash zone. In these embodiments, the separator can include a cyclonic phase separation device, a splitter, or another type of separation device based on physical or mechanical separation of vapors and liquids. As for a flash separation device, these devices may be followed by a heat exchanger or condenser to condense the gas stream 120.

In some configurations of the processing facility 100, such as that shown in FIG. 1, the gas stream 120 is routed to a hydrogen production system 122. In the hydrogen production system 122, the gas stream 120 can be used to produce a hydrogen stream 124, for example, using a steam reforming system, a gasification system, a partial oxidation system, or combinations thereof. A water or steam stream 126 may be added to provide make up water for water shift reactions. For partial oxidation, or gasification, an air or oxygen stream may also be fed to the reactors of the hydrogen production system 122. In a steam reforming process, the hydrocarbons are contacted with the steam at about 700° C. to about 1000° C., for example, in a steam reforming reactor, over a nickel catalyst, producing and $H_2$, CO, and $CO_2$. In a second vessel, such as a separation vessel, the CO is reacted with more steam to form $H_2$ and $CO_2$ in a water shift reaction. In some embodiments, the stream does not go through a water shift reaction but is fed into a hydrogen separation process effectively separating the hydrogen from the remaining CO and $CO_2$. The $CO/CO_2$ containing stream is then fed to unit 136 which converts CO and $CO_2$ to synthetic fuels or chemicals.

In a gasification process, the hydrocarbons from the gas stream 120 are also converted into $H_2$, CO, and $CO_2$. In gasification, or partial oxidation, the hydrocarbons are reacted with a controlled amount of oxygen, steam, or both, at greater than about 700° C., for example, without combustion, in a gasification reactor. The process is exothermic, allowing heat to be generated for use in other portions of the process. In a second vessel, such as a separation vessel, the CO may be reacted with more steam to form $H_2$ and $CO_2$ in a water shift reaction.

In embodiments in which the hydrogen production system 122 includes both a steam reforming and a gasification system the separation sections and water shift systems may be integrated. The integration of the systems can be achieved using a membrane reformer in which hydrogen selective membranes are used in conjunction with a reforming catalyst, such as a nickel catalyst. This will allow combining reforming, water-gas shift operations allowing process intensification of the hydrogen production process. In some embodiments, the hydrogen stream 124 is used as the source of the hydrogen stream 116 provided to the hydroprocessing system 114.

In embodiments in which the hydrogen production system 122 includes a gasification process, the gas generated in the gasifier may be water shifted in a membrane reactor that can operate at about 250° C. to about 300° C. with a hydrogen selective membrane and a water-gas shift catalyst integrated in the membrane reactor, such as a nickel catalyst. This also allows for the separation of $CO_2$, formed in-situ, which is removed as a $CO_2$ stream 128.

For a conventional reforming or gasification process configurations, a pressure swing absorption (PSA) system may be included in the hydrogen production system 122 for the purification of hydrogen, including a raw hydrogen stream 130 produced in a cracking system, such as a reformer 132, and separated in a products separation system 134. The raw hydrogen stream 130 includes hydrogen and methane and is sourced from a demethanizer inside the products separation system 134. The raw hydrogen stream 130 is routed to the PSA system in the hydrogen production system 122. The PSA system may include two columns filled with a zeolite absorbent, one active column and one regenerating column. The hydrogen streams are combined and flowed through the active column, which absorbs impurities from the hydrogen flow. In embodiments, the purity of the hydrogen in the hydrogen stream 124 is greater than about 80 vol. %, greater than about 90 vol. %, greater than about 95 vol. %, or higher.

The $CO_2$ stream 128 is routed to a $CO_2$ conversion system 136 for conversion of the $CO_2$ to synthetic hydrocarbons or other useful products. The conversion may be performed through hydrogenation or through further reforming in dry or wet conditions with lighter hydrocarbons. If wet conditions are used, a steam stream may be added. It may be understood that the CO formed in the hydrogen production system 122 may be routed to the $CO_2$ conversion system 136 along with, or instead of, the $CO_2$. The $CO_2$ conversion reaction may include a steam reaction to convert $CO_2$ to $H_2$ and CO, if needed. The feedstocks may then be fed to a Fischer-Tropsch reactor to convert the hydrogen and carbon monoxide to hydrocarbons. In the Fischer-Tropsch reactor, the $H_2$ and CO are flowed over a catalyst at a temperature of about 150° C. to about 300° C. Lower temperatures favor higher carbon numbers. The catalyst may be a cobalt-based catalyst, an iron-based catalyst, a ruthenium-based catalyst, or a combination.

In some embodiments, the $CO_2$ conversion system 136 may produce a product stream 138 that includes methane or syngas as furnace fuel for other systems, such as the hydroprocessing system 114 or the reformer 132, among others. In some embodiments, the product stream 138 is used as a make-up stream for a sales gas pipeline. In some embodiments, the product stream 138 is used as a feedstock for a number of other chemicals or synthetic fuels streams. In some embodiments, the $CO_2$ is hydrogenated using hydrogen from the hydrogen stream 116, for example, forming dimethyl ether (DME), methanol, or other oxygenated compounds as part of the product stream 138. In some embodiments, the $CO_2$ stream 128 is provided to a $CO_2$ pipeline for enhanced oil recovery or sequestration.

A portion of the liquid stream 118 from the hydroprocessing system 114 may be blended into the power generation stream 108 to form a blended stream. The blending of the liquid stream 118, which has been hydroprocessed, may be used to adjust the Wobbe index of the fuel feeding the power generation system 104 and reduce its sulfur content. As used herein, the Wobbe index is a measure of the energy output that may be obtained from the combustion of a fuel, and is calculated by dividing the calorific value obtained from burning a fuel by the square root of the specific gravity of the fuel. Lighter hydrocarbons, for example, with lower carbon numbers, generally have lower Wobbe indices than heavier hydrocarbons. As an example, the Wobbe index for methane may be around 50 MJ/Nm$^3$, while the Wobbe index for in butane may be around 88 MJ/Nm$^3$.

The remaining liquid stream 118 from the hydroprocessing system 114 is routed to a reformer 132, such as a naphtha reforming system. The reformer 132 may be a continuous catalytic reforming (CCR) system. In some embodiments, the reformer 132 is replaced with a cracking system, for example, including a steam cracking furnace. Because the liquid stream 118 was processed in the hydroprocessing system 114 upstream of the reformer 132, no further hydrotreating of the liquid stream 118 is performed before the liquid stream 118 is fed into the reformer 132. The reformer 132 converts the liquid stream 118 into a reformate stream 140, or effluent, that is rich in aromatics, such as benzene, toluene, and xylene (BTX). In addition to aromatics the reformate stream 140 may include hydrogen, liquid propane gas, and a paraffinic raffinate. In some examples, the reformer 132 enables a high production of xylene at the expense of a lower production of benzene.

The reformer 132 includes one or more reactors that use reactions such as hydrocracking, isomerization, dehydrocyclization, and dehydrogenation to convert the liquid stream 118 into the reformate stream 140. The reformer 132 can include a catalyst that is compatible with catalytic processes that maximize production of aromatics. For example, the catalyst can be a mono- or bi-functional metal catalyst, including one or more of platinum, palladium, rhenium, tin, gallium, bismuth, or other metal catalysts. The catalyst may be a halogen containing catalyst, a catalyst employing a zeolite such as zeolite L or a ZSM-5 zeolite, a catalyst employing a crystalline or amorphous support that is mesoporous or microporous, such as an alumina, silica, or alumina silica support, or another type of catalyst that can maximize aromatics production. Further, the catalysts may include hydroprocessing catalysts, as described herein.

The operating conditions of the reformer 132 can be selected to maximize aromatics production. The reformer 132 can operate at a pressure between about 0.01 bar and about 50 bar, such as about 0.01 bar, about 0.1 bar, about 0.5 bar, about 1 bar, about 5 bar, about 10 bar, about 20 bar, about 30 bar, about 40 bar, about 50 bar, or another pressure. The molar ratio of hydrogen to hydrocarbon in the reformer 132 can be between about 1:1 and about 10:1, such as about 1:1, about 2:1, about 4:1, about 6:1, about 8:1, about 10:1, or another ratio. The reformer 132 can operate at a temperature between about 400° C. and about 600° C., such as about 400° C., about 450° C., about 500° C., about 550° C., about 600° C., or another temperature. The reformer 132 can operate with a liquid hour space velocity between about 0.1 h$^{-1}$ and about 5 h$^{-1}$, such as about 0.1 h$^{-1}$, about 0.5 about 1 h$^{-1}$, about 2 h$^{-1}$, about 3 h$^{-1}$, about 4 h$^{-1}$, about 5 h$^{-1}$, or another liquid hour space velocity.

In some embodiments, the products separation system 134 includes an aromatics extraction system to separate aromatics from reformate stream 140 using extraction techniques such as solvent extraction, extractive distillation, or other extraction techniques. The aromatic extraction system receives the reformate stream 140, as well as other product streams generated herein, and produces aromatics and non-aromatics product streams. In various embodiments, the aromatics product streams include a benzene product stream 142, a toluene product stream 144, a paraxylene product stream 146, and a heavy aromatics product stream 148. Non-aromatics streams that may be produced from the products separation system 134, include a recycle stream 150 that generally includes fully saturated light hydrocarbons, such as ethane and propane. Other streams that may be produced from the products separation system 134 may include pyrolysis gasoline streams, heavy fuel oil streams, and the like. The recycle stream 150 may be provided to the reformer 132, the hydrogen production system 122, or divided between both, depending on the economics of hydrogen production or chemicals production.

In various embodiments, the reformer 132 is replaced with another type of cracking system for processing the liquid stream 118. For example, a steam cracking system may be used in place of the reformer 132. The steam cracking system is a combination of gas and liquid furnaces. A steam feed is provided to one or more the furnaces of the steam cracking system. The furnaces can be flexible or may be customized for some of the feed sent to the steam cracking system. The flow through the steam cracking furnaces of the steam cracking system may provide a total exposure time of about 1 millisecond (ms), about 2 ms, about 5 ms, or about 10 ms. A quench tower may be provided immediately after the steam cracking furnace to cool the effluent from the steam cracking furnace and stop further reactions from taking place. As for the reformer 132, the steam cracking system may use the recycle stream 150 from the products separation system 134 as a secondary feed.

Similar to the reformate stream 140 from the reformer 132, the product stream from the steam cracking system is provided to the products separation system 134. The product stream from the steam cracking system may include low carbon number compounds, such as ethane and propane, as well as aromatic compounds, such as benzene, toluene, and xylene.

The AM removal system 106 generates an asphaltene stream 152 that includes the asphaltenes and heavy metals from the feed stream 102. In some embodiments, the asphaltene stream 152 is used internally in other units of the processing facility 100, for example, being blended with diesel or kerosene to produce heavy oil with a specific viscosity, such as 180 cSt or 380 cSt. Further, the asphaltene stream 152 can be provided as fuel to the cement industry or as a product stream for asphalt production. In some embodiments, the asphaltene stream 152 may be used to form other products in a heavy oil conversion system (HOCS) 154 or a coker 156. The asphaltenes stream 152 has a theoretical boiling point of greater than about 600° C., however, asphaltenes are generally solids or softened solids at the processing temperatures used.

In the HOCS 154, the asphaltene stream 152 may be reacted with a hydrogen stream 116 to form a cracked product stream 158 that includes lighter hydrocarbons than the asphaltene stream 152. The cracked product stream 158 is provided to the products separation system 134. The cracked product stream 158 may have a boiling point between about 150° C. and about 205° C. A portion of the cracked product stream 158 may be provided to the reformer 132, as shown in FIG. 1. At least a portion of the heavy aromatics product stream 148 may be returned to the HOCS 154 for further processing. The HOCS 154 may generate a fuel oil product stream 160.

The fuel oil product stream 160 may include the heavier hydrocarbons which cannot be converted in the hydrogen production system 122, the reformer 132, or recycled to the hydroprocessing system 114. The fuel oil product stream 160 may also be a purge stream if a portion of a pyoil stream is recycled to the HOCS 154. In embodiments described herein, the fuel oil product stream 160 may be a high sulfur, low viscosity, and high density fuel oil, as it is generated from the asphaltenes stream 152. The aromaticity of the fuel oil product stream 160 will provide a viscosity of less than about 200 centistokes (cSt), less than about 180 cSt, less than about 150 cSt, or lower. Accordingly, the fuel oil product stream 160 may be used as a bunker oil for shipping. However, the economic value of this fuel oil may be adjusted by varying the streams used to form the fuel oil product stream 160 and by adjusting the operating conditions of the different systems. In some embodiments, a higher proportion of the heavy aromatics product stream 148 from the products separation system 134 may be used in the HOCS 154 to lower the sulfur content. In some embodiments, the fuel oil product stream 160 may be provided to the coker 156 for further processing, for example, to increase the yield of lower molecular weight hydrocarbons.

In some embodiments, the asphaltene stream 152 is provided to the coker 156. As used herein, a coker is a processing unit that converts heavy hydrocarbons, such as the asphaltene stream 152, into lower molecular weight hydrocarbons, including hydrocarbon gases, naphtha, light and heavy gas oils, and petroleum coke. The coker 156 can include any type of commercial coking unit, such as a delayed coker or a fluid coker. In the coker 156, a light hydrocarbons stream 162 is produced by thermal cracking of the asphaltene stream 152. The light hydrocarbons stream 162 may have a boiling point between about 150° C. and about 205° C. In some embodiments, steam may be injected into the coker 156 to facilitate the reactions. The light hydrocarbon stream 162 is provided to the products separation system 134. At least a portion of the heavy aromatics product stream 148 may be returned to the coker 156 for further processing. A petroleum coke product stream 164 is provided as a product stream from the coker 156. In embodiments described herein, the petroleum coke product stream 164 is generally fuel grade, for example, high in sulfur and metals. The petroleum coke product stream 164 may be further processed, for example, in a rotary kiln to remove residual volatile hydrocarbons. The composition of the petroleum coke product stream 164 may be as shown in Table 1.

TABLE 1

Example composition of petroleum coke

| | |
|---|---|
| Density | 688 kg/m3 |
| C | 85.9% wt dry |
| H | 3.6% wt dry |
| N | 0.94% wt dry |
| O (calculated) | 0.2% wt dry |
| S | 9.18% wt dry |
| Ash | 0.2% wt dry |
| Metal | 800 mg/kg dry |
| Moisture | 7.4% wt |

The products separation system 134 includes all systems for producing the chemical products from the conversion process. In various embodiments, the products separation system 134 includes the demethanizer, the quench columns, hydrogenation reactors, primary fractionation columns, compressor and sets of columns to allow the production of the benzene product stream 142, the toluene product stream 144, the paraxylene product stream 146, the heavy aromatics product stream 148, as well as other product streams including ethylene, propylene, mixed C4s, and pyrolysis gasoline, among others. The products separation system 134 further includes the high-distillation temperature (HDT) and aromatics separation section to treat the pygas and separate BTX from this stream. It also includes the selective hydrogenation systems to saturate the tri-olefins produced in the steam cracking furnaces. The products separation system 134 is fed by the reformate stream 140 from the reformer 132. It is also fed with the cracked product stream 158 from the HOCS 154, and the light hydrocarbon stream 162 from the coker 156. As described herein, the products separation system 134 produces the heavy aromatics product stream 148, which can be recycled to the HOCS 154, or provided as a product stream to other processes.

Figure 2A:
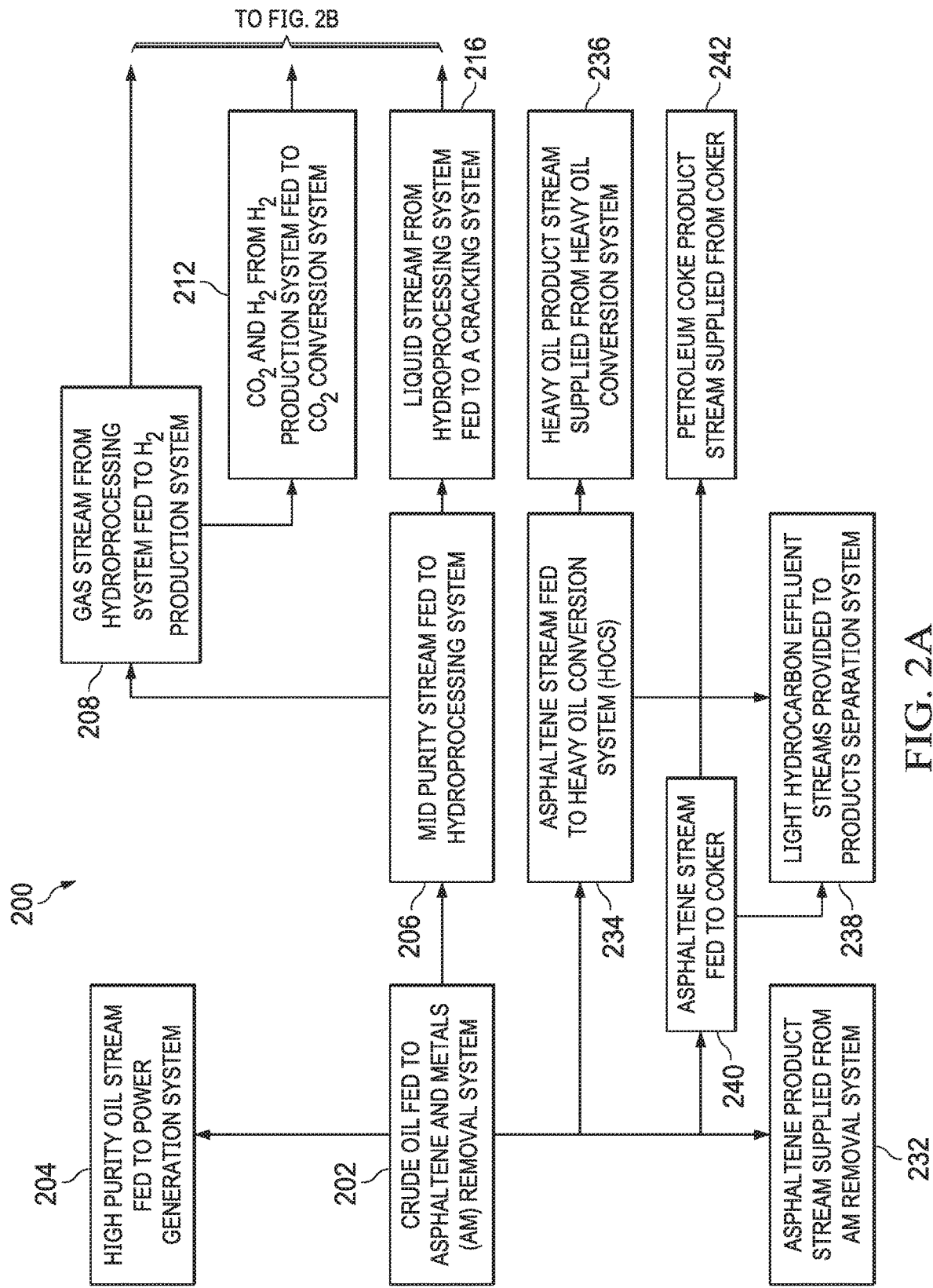

FIGS. 2A and 2B are flowcharts of a process 200 for using a feed stream to directly power a generation system while producing petrochemicals. The process begins at block 202, when a feed stream, such as a crude oil or condensate feed, is fed to an asphaltene and metals (AM) removal system. At block 204, a high-purity oil stream is fed to a power generation system from the AM removal system, as described herein.

At block 206, a mid-purity stream is fed to a hydroprocessing system. At block 208, a gas stream from the hydroprocessing system is fed to a hydrogen production system. At block 210, a hydrogen product stream is supplied from the hydrogen production system. Portions of the hydrogen product stream can be used as a feedstock for the hydroprocessing system, the heavy oils conversion system, or the carbon dioxide conversion system.

The CO and carbon dioxide from the hydrogen production system of block 208 is processed in the carbon dioxide conversion system of block 212 to form synthetic fuels and other chemicals. At block 214, these are provided as synthetic product streams, which may be used as fuels or in downstream processes.

At block 216, a liquid stream from the hydroprocessing system is fed to a cracking system. As described herein, the cracking system may be a reformer, a steam cracker, or another type of cracking system.

At block 218, the effluent from the cracking system is fed to a products separation system. At block 220, a benzene product stream is supplied from the products separation system. At block 222, a toluene product stream is supplied from the products separation system. At block 224, a paraxylene product stream is supplied from the product separation system. At block 226, a heavy aromatic product stream is supplied from the product separation system. At block 228, a recycle stream including light hydrocarbons is fed from the product separation system to the hydrogen production system, the cracking system, or both. At block 230, a hydrogen rich gas from the product separation system is fed to the hydrogen production system. The hydrogen rich gas may be further purified, for example, in a pressure swing absorption (PSA) system incorporated into the hydrogen production system.

At block 232 an asphaltene product stream is supplied from the AM removal system. At block 234, the asphaltene product stream is supplied to a heavy oil conversion system. At block 236, a heavy oil product stream is supplied from the heavy oil conversion system. At block 238 a light hydrocarbon effluent stream is provided from the heavy oil conversion system to the products separation system.

At block 240, the asphaltene product stream is supplied to a coker. At block 242, a petroleum coke product stream is supplied from the coker. At block 238, a light hydrocarbon effluent stream is provided from the coker to the products separation system.

Depending on the components of the crude oil stream, or the economics of the process, the heavy oil conversion system, the coker, or both, may be omitted. For example, if a crude oil or condensate stream does not have a high content of high carbon number materials, such as a light crude, the heavy oil conversion system may not be needed. Further, if the economics of the process do not favor the fuel oil product stream, the heavy oil conversion system may be bypassed or eliminated. In some embodiments, the heavy oil conversion system is present, but configured to be bypassed.

An embodiment described herein provides a processing facility. The processing facility includes an asphaltenes and metals (AM) removal system configured to process a feed stream to produce a power generation stream, a hydroprocessing feed stream, and an asphaltenes stream. A a power generation system is fed by the power generation feed stream. A hydroprocessing system is configured to process the hydroprocessing feed stream to form a gas stream and a liquid stream. A hydrogen production system is configured to produce hydrogen, carbon monoxide and carbon dioxide from the gas feed stream. A carbon dioxide conversion system is configured to produce synthetic hydrocarbons from the carbon dioxide, and a cracking system is configured to process the liquid feed stream.

In an aspect, the feed stream includes a crude oil. In an aspect, the feed stream includes a condensate.

In an aspect, the power generation system includes a gas turbine. In an aspect, the gas turbine is E class, F class, or H class, or higher.

In an aspect, the hydrogen production system includes a steam reforming reactor. In an aspect, the hydrogen production system includes a gasification reactor. In an aspect, the hydrogen production system includes a pressure swing absorption system. In an aspect, wherein the hydrogen production system includes a water shift system converting carbon monoxide to carbon dioxide.

In an aspect, the carbon dioxide conversion system includes a Fischer-Tropsch reactor. In an aspect, the carbon dioxide conversion system includes a dry reforming process. In an aspect, the processing facility includes a hydrogen separation system configured to purify the hydrogen and send carbon monoxide and carbon dioxide to the carbon dioxide conversion system.

In an aspect, the hydroprocessing system includes a hydrodemetallization zone, a hydrodearomatization zone, a hydrodenitrogenation zone, a hydrodesulfurization zone, or a hydrocracking zone, or any combinations thereof.

In an aspect, the cracking system includes a reformer. In an aspect, at least a portion of the hydrogen produced in the hydrogen production system is supplied to the reformer. In an aspect, the reformer includes an isomerization reactor, a hydrocracking reactor, a dehydrocyclization reactor, or a dehydrogenation reactor, or any combinations thereof. In an aspect, the cracking system includes a steam cracker.

In an aspect, the processing facility includes a heavy oil conversion system. In an aspect, the processing facility includes a coker.

In an aspect, the processing facility includes a products separation system configured to separate product streams from the cracking system, a heavy oil conversion system, or a coker, or any combinations thereof. In an aspect, the products separation system is configured to provide a raw hydrogen stream to the hydrogen production system. In an aspect, the products separation system is configured to feed a light hydrocarbon stream to the cracking system, or the hydrogen production system, or both. In an aspect, the products separation system includes an aromatics separation system. In an aspect, the products separation system is configured to produce a benzene product stream, a toluene product stream, a paraxylene product stream, or a heavy aromatics stream, or any combinations thereof. In an aspect, the products separation system is configured to feed at least a portion of the heavy aromatics stream to the heavy oil conversion system, or the coker, or both.

Another embodiment described herein provides a method for generating power and petrochemicals in an integrated system. The method includes removing asphaltenes and metals (AM) from a feed stream in an AM removal system to form a power generation stream, a hydroprocessing feed stream, and an asphaltenes stream. The power generation stream is supplied to a power generation system. The hydroprocessing feed stream is processed in a hydroprocessing system to form a gas stream and a liquid stream, and the gas stream is provided to a hydrogen production system. The liquid stream is provided to a cracking system.

In an aspect, the method includes blending at least a portion of the hydroprocessing feed stream with the power generation stream to form a blended stream, and supplying the blended stream to the power generation system. In an aspect, the method includes blending at least a portion of the liquid stream with the power generation stream to form a blended stream, and supplying the blended stream to the power generation system.

In an aspect, the method includes providing a hydrogen stream to the hydroprocessing system from the hydrogen production system. In an aspect, the method includes separating hydrogen from the carbon monoxide and carbon dioxide, and feeding the carbon monoxide and carbon dioxide to the carbon dioxide conversion system. In an aspect, a hydrogen product stream is provided from the hydrogen production system. In an aspect, carbon dioxide is provided from the hydrogen production system to a carbon dioxide conversion system. In an aspect, a synthetic product stream is provided from the carbon dioxide conversion system. In an aspect, an effluent is fed from the cracking system to a products separation system.

In an aspect, the method includes supplying an asphaltene stream from the AM removal system. In an aspect, the asphaltene stream is fed to a heavy oil conversion system (HOCS). In an aspect, a light hydrocarbon effluent stream from the HOCS is provided to a products separation system. In an aspect, a heavy oil product stream is provided from the HOCS.

In an aspect, the method includes feeding the asphaltene stream to a coker. In an aspect, a petroleum coke product stream is provided from the coker. In an aspect a light hydrocarbon effluent stream is provided from the coker to a products separation system.

In an aspect, the method includes feeding a light hydrocarbon stream from a products separation system to the hydrogen production system. In an aspect, the method includes feeding a light hydrocarbon stream from a products separation system to the cracking system.

In an aspect, the method includes sending a raw hydrogen stream from a product separation system to the hydrogen production system.

In an aspect, a products separation system including an aromatics extraction system is included in the processing facility. In an aspect, a benzene product stream is provided from the products separation system. In an aspect, a toluene product stream is provided from the products separation system. In an aspect, a paraxylene product stream is provided from the products separation system.

In an aspect, the heavy aromatics product stream is provided from a products separation system. In an aspect, the heavy aromatics product stream is provided to a heavy oils conversion unit. In an aspect, the heavy aromatics product stream is provided to a coker.

Other implementations are also within the scope of the following claims.

What is claimed is:

1. A method for generating power and petrochemicals in an integrated system, comprising:
   removing asphaltenes and metals (AM) from a feed stream in an AM removal system to form a power generation stream, a hydroprocessing feed stream, and an asphaltenes stream, wherein the feed stream comprises crude oil or condensates, and the AM removal system comprises a solvent deasphalting system;
   supplying the power generation stream from the AM removal system to a power generation system;
   processing the hydroprocessing feed stream in a hydroprocessing system to form a gas stream and a liquid stream;
   providing the gas stream to a hydrogen production system; and
   providing the liquid stream to a cracking system.

2. The method of claim 1, comprising:
   blending at least a portion of the hydroprocessing feed stream with the power generation stream to form a blended stream; and
   supplying the blended stream to the power generation system.

3. The method of claim 1, comprising:
   blending at least a portion of the liquid stream with the power generation stream to form a blended stream; and
   supplying the blended stream to the power generation system.

4. The method of claim 1, comprising providing a hydrogen stream to the hydroprocessing system from the hydrogen production system.

5. The method of claim 1, comprising:
   separating hydrogen from the carbon monoxide and carbon dioxide; and
   feeding the carbon monoxide and carbon dioxide to the carbon dioxide conversion system.

6. The method of claim 1, comprising providing a hydrogen product stream from the hydrogen production system.

7. The method of claim 1, comprising providing carbon dioxide from the hydrogen production system to a carbon dioxide conversion system.

8. The method of claim 7, comprising providing a synthetic product stream from the carbon dioxide conversion system.

9. The method of claim 1, comprising feeding an effluent from the cracking system to a products separation system.

10. The method of claim 1, comprising supplying an asphaltene stream from the AM removal system.

11. The method of claim 1, comprising feeding the asphaltene stream to a heavy oil conversion system (HOCS).

12. The method of claim 11, comprising providing a light hydrocarbon effluent stream from the HOCS to a products separation system.

13. The method of claim 11, comprising providing a heavy oil product stream from the HOCS.

14. The method of claim 1, comprising feeding the asphaltene stream to a coker.

15. The method of claim 14, comprising providing a petroleum coke product stream from the coker.

16. The method of claim 14, comprising providing a light hydrocarbon effluent stream from the coker to a products separation system.

17. The method of claim 1, comprising feeding a light hydrocarbon stream from a products separation system to the hydrogen production system.

18. The method of claim 1, comprising feeding a light hydrocarbon stream from a products separation system to the cracking system.

19. The method of claim 1, comprising sending a raw hydrogen stream from a product separation system to the hydrogen production system.

20. The method of claim 1, comprising a products separation system comprising an aromatics extraction system.

21. The method of claim 20, comprising providing a benzene product stream from the products separation system.

22. The method of claim 20, comprising providing a toluene product stream from the products separation system.

23. The method of claim 20, comprising providing a paraxylene product stream from the products separation system.

24. The method of claim 20, comprising providing a heavy aromatics product stream from a products separation system.

25. The method of claim 24, comprising providing the heavy aromatics product stream to a heavy oils conversion unit.

26. The method of claim 24, comprising providing the heavy aromatics product stream to a coker.

\* \* \* \* \*